(12) United States Patent
Melsen et al.

(10) Patent No.: US 7,761,553 B2
(45) Date of Patent: Jul. 20, 2010

(54) METHOD AND ARRANGEMENT IN AN ACCESS SYSTEM

(75) Inventors: Torben Melsen, Holstebro (DK); Tomas Thyni, Järfälla (DK)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 97 days.

(21) Appl. No.: 12/094,950

(22) PCT Filed: Nov. 29, 2005

(86) PCT No.: PCT/SE2005/001797

§ 371 (c)(1),
(2), (4) Date: May 23, 2008

(87) PCT Pub. No.: WO2007/064253

PCT Pub. Date: Jun. 7, 2007

(65) Prior Publication Data

US 2008/0294755 A1  Nov. 27, 2008

(51) Int. Cl.
*G06F 15/173* (2006.01)
(52) U.S. Cl. .............. 709/223; 709/224; 709/217; 709/245
(58) Field of Classification Search ............ 709/223, 709/224, 203, 217, 219, 245
See application file for complete search history.

(56) References Cited

U.S. PATENT DOCUMENTS 5,835,727 A * 11/1998 Wong et al. ............ 709/238
6,957,276 B1 * 10/2005 Bahl ..................... 709/245
7,039,688 B2 * 5/2006 Matsuda et al. ......... 709/220
7,054,944 B2 * 5/2006 Tang et al. ............. 709/229
7,197,549 B1 * 3/2007 Salama et al. .......... 709/223
7,254,630 B1 * 8/2007 Daude et al. ........... 709/224
7,437,552 B2 * 10/2008 Shin .................... 713/160
7,443,862 B2 * 10/2008 Nishio ................ 370/395.54
7,463,607 B2 * 12/2008 Sood et al. ............ 370/331
7,477,648 B2 * 1/2009 Ota et al. .............. 370/401
7,506,067 B2 * 3/2009 Cors et al. ............. 709/245
7,577,146 B2 * 8/2009 Arberg et al. .......... 370/392

FOREIGN PATENT DOCUMENTS

WO    WO-2005/086427 A1    9/2005

* cited by examiner

*Primary Examiner*—Lashonda T Jacobs

(57) ABSTRACT

An access node connected to end-users, routers, and a DHCP-server. The end-user defines desired services provided via the routers. A purpose is to automatically provide simultaneous access to services via two or more of the routers, although the end-user simultaneously handles only one router. The connections are secure. The end-user requests one of the services. The access node identifies the end-user and sends a corresponding request to the DHCP-server, which dynamically allocates addresses to the end-user and to all the routers for the desired services. The access node snoops the addresses in a DHCP option message from the DHCP-server, resolves the router addresses, stores IP router addresses and IP MAC addresses in a memory and sets MAC addresses in MAC filters. An option reply with one router is sent to the end-user, which after request for one service, reaches all the services stored in the memory.

14 Claims, 4 Drawing Sheets

METHOD AND ARRANGEMENT IN AN ACCESS SYSTEM

TECHNICAL FIELD

The present invention refers to providing multiple services in an access system.

BACKGROUND

A user of services provided via telecommunication networks often needs to have simultaneous access to a plurality of service providers. It is also essential that the connections set up are secure and are unable to use for other subscribers than the user in question.

A mechanism known as MAC-Forced Forwarding MFF ensures secure connections. The mechanism ensures that all end-users connected to a specific Service VLAN inside an Ethernet Aggregation Network are allowed access only to a default gateway and not directly to each other or to other edge nodes attached to the service VLAN. The MFF mechanism also permits an access node, to which the end-users are connected, to dynamically learn the address of the mentioned default gateway to allow access to for each end-user IP host. This is done by the access node snooping a DHCP reply to the end-user IP host after a DHCP request for an IP address from the end-user. The MFF mechanism was designed with single-edge access per IP host in mind, i.e. for access to one default gateway. The MFF mechanism is more closely described in T. Melsen, S. Blake: "MAC-Forced Forwarding: A Method for Traffic Separation on an Ethernet Access Network", available on the web at draft-melsen-mac-forced-fwd-03.

Support for a general multi-edge access, i.e. simultaneous access to the plurality of service providers, requires the end-user IP host to be able to access a multiple number of edge nodes simultaneously. This enables so called true triple-play scenarios, in which a single end-user IP host can access e.g. high-speed Internet service, Voice over IP service and IPTV service simultaneously, delivered by separate edge nodes. This is made possible by provisioning the edge nodes IP addresses statically in the access node. An operator of the network writes the addresses manually in the access node. The method is simple and secure but is relatively cumbersome.

SUMMARY

The present invention is concerned with a main problem to provide for an end user to have simultaneous and secure access to multiple routers. Manual assignment of multiple IP-addresses to the end-user is a part of the problem.

A further problem is that the set up connections are secure and are available only for the end-user in question.

Still a problem is to prevent said end-user to get access to a service that is not allowed for the user.

The problem is solved by an access node snooping and storing IP-addresses of the routers the end-user is allowed to access. The routers IP addresses are resolved into MAC addresses by the access node using standard Address Resolution Protocol ARP. The IP addresses of the allowed routers are communicated dynamically to the access node.

Somewhat more in detail the problem is solved in that the access node receives a request concerning a service that the end-user is entitled to. The access node sends the request to a server and receives a reply with a dynamically assigned end-user host IP address, and IP addresses to routers that should be accessible by the user. The access node reads the reply, saves the routers IP address and resolves the routers MAC addresses. The access node sends a reply to the end-user with at least one of the IP router addresses.

A purpose of the present invention is to provide a more flexible access scheme, e.g. for triple play scenarios, by allowing end-users IP hosts to have simultaneous access to multiple routers.

Another purpose is to avoid manual configuration of accessible routers and instead provide dynamic configuration.

A further purpose is to give IP hosts, which can only handle a single router, access to multiple routers.

Still a purpose is to make access unable to a service for a not entitled end-user.

Still another purpose is to provide secure connections.

The invention has an advantage to provide a more flexible access scheme by allowing end-users IP hosts to have simultaneous access multiple routers.

Another advantage is that manual configuration of accessible routers is avoided.

A further advantage is that IP hosts, which can only handle single routers, are given access to multiple routers.

Still an advantage is that abusive use of services is avoided.

Still another advantage is that secure connections are provided.

The invention will now be described more closely with the aid of embodiments and with references to enclosed figures.

DETAILED DESCRIPTION

Figure 1:
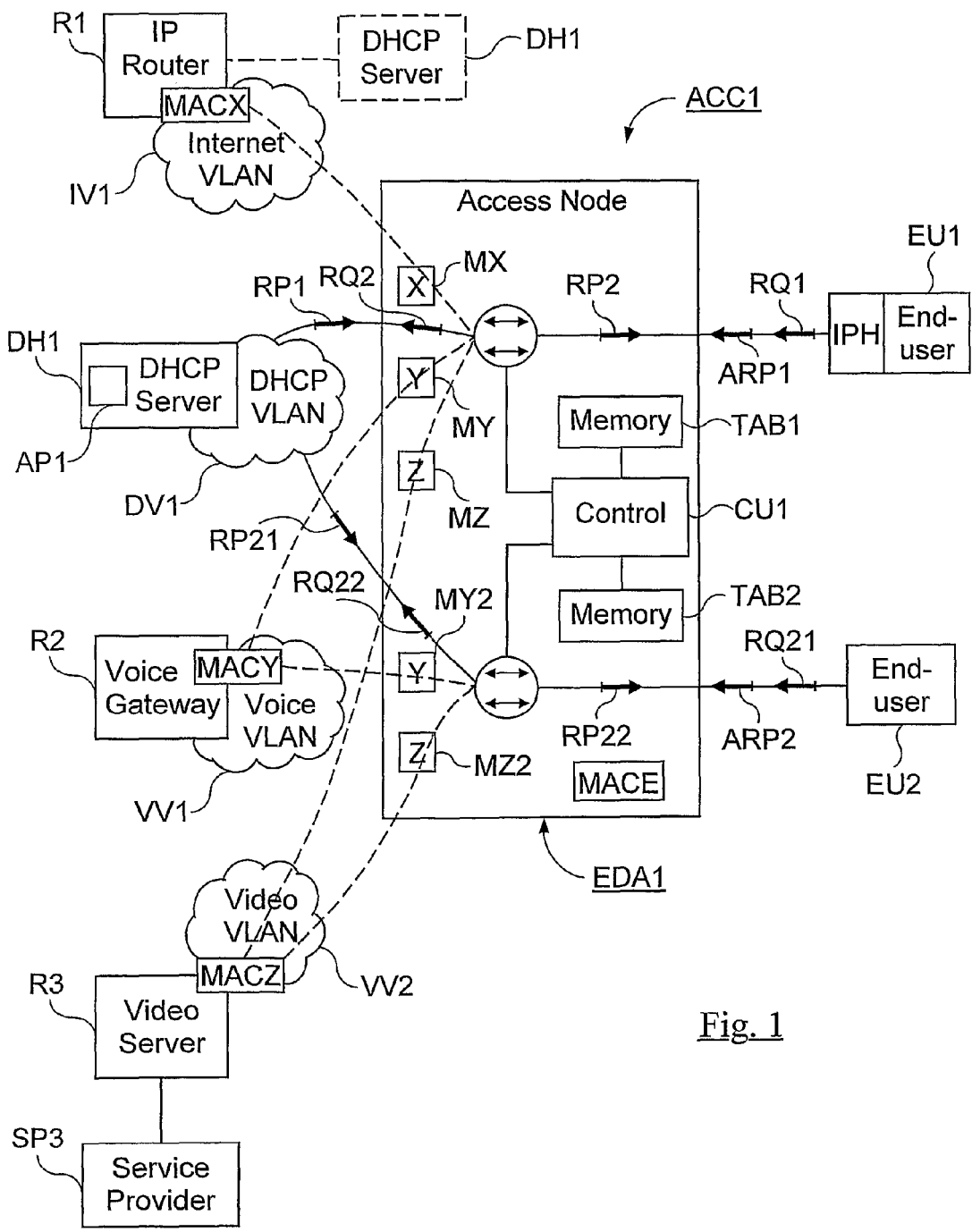
FIG. 1 shows a view over an access system.

FIG. 1 shows a view over an access system ACC1. The system has an access node EDA1 to which end-users EU1 and EU2 are connected. Three service provider access routers R1, R2 and R3, providing services to the end-users, are connected to the access node. The first router R1 is an IP router in an Internet VLAN denoted IV1. The second router R2 is a voice gateway in a voice VLAN denoted VV1. The third router R3 is a video server in a video VLAN denoted VV2. The three routers R1, R2 and R3 have IP MAC addresses MACX, MACY and MACZ respectively. Also a DHCP server DH1, in a DHCP VLAN denoted DV1, is connected to the access node EDA1.

In the access node are arranged MAC filters MX, MY and MZ, which only let through the respective IP MAC addresses MACX, MACY and MACZ. Also MAC filters MY2 and MZ2, which only let through the respective IP MAC addresses MACY and MACZ, are arranged in the access node. The access node also has memories TAB1 and TAB2 as will be more closely described below. A control function CU1 controls the working of the access node EDA1. As an alternative the DHCP server DH1 can be connected to the first router R1, as is shown in dashed lines in the figure.

The DHCP server DH1 has an address pool AP1 with end-user IP host addresses, which can be allocated dynamically.

The end-users EU1 and EU2 can point out which of the services provided via the routers R1, R2 and R3 they desire to have access to. The end-user EU1 has determined a set of services consisting of services from the Internet VLAN IV1, the voice VLAN VV1 and the video VLAN VV2 as shown by dotted lines in the figure. The end user EU2 has determined a set of services from only the Internet VLAN IV1 and the voice VLAN VV1, which also is shown by dotted lines. The services are initially selected by the respective end-user and are ordered via any conventional means, e.g. by a telephone call to an operator or via a web page.

In the present embodiment of the method the Dynamic Host Configuration Protocol DHCP and its different options are utilized. In short the DHCP protocol allocates IP addresses to the end-user hosts and allocates ways out of the local net via the routers. More information is to be found on the web at www.ietf.org, number RFC 3442.

When the end-users desire access to the services provided via the edge access routers R1, R2 and R3, they utilize the access system ACC1 in the following manner. As an example the end-user EU1 wants a service on the Internet IV1 provided via the router R1. The end-user EU1 therefore sends a corresponding DHCP request RQ1. The control function, which listens to the traffic, recognizes the DHCP request. The access node EDA1 is configured such that it can accept the request. The access node receives the request RQ1 and the control function CU1 completes it with a DHCP option 82, which identifies the end-user EU1 with the aid of its port identifier. The access node EDA1 then transmits the completed DHCP request, denoted by RQ2, to the DHCP server DH1.

When the DHCP server DH1 receives the DHCP request RQ2 it dynamically allocates an end-user IP host address IPH from the address pool AP1, and accessible routers R1, R2, R3. Access to these routers were once ordered by the end-user EU1 as described above. The server DH1 then forms a DHCP reply message RP1 which includes a DHCP option 121. This option 121 indicates which addresses the different routers R1, R2 and R3 have and the networks that can be reached via each router. The DHCP reply RP1 is transmitted to the access node EDA1.

The access node EDA1 receives the DHCP reply message RP1 and the control function snoops the content in the message. It then makes an ARP request for the MAC addresses of the routers and saves the content in the memory TAB1 as appears from the table below.

arises that many end-users cannot handle the DHCP option 121 with several IP router addresses but can only handle the DHCP option 3 with one IP router address. Therefore the control function CU1 of the access node EDA1 translates the DHCP option 121 in the reply message RP1 into DHCP option 3 with the only network address IPN1 before it sends a DHCP reply message RP2 to the end-user EU1.

The end-user EU1 receives the message RP2 with the IP router address IPN1 and makes an ARP request ARP1 with this address. When the access node EDA1 receives this request it compares the address IPN1 with the content in the above memory TAB1. If the requested IP router address coincides with the saved IP router address in the table TAB1 the access node gives the end-user EU1 access. This access is not only valid for the requested router R1 but does also comprise access to the routers R2 and R3 and the services that they provide.

The ARP request includes not only the IP router address IPN1 but also a MAC address. This MAC address should in the present embodiment be the address MACX, but this can be wrong router MAC address for the specific service. This depends on that the end-user EU1 only is aware of one single MAC and router address. When end-user data packets are received by the access node, the control function CU1 automatically corrects such an incorrect MAC address with the aid of the content of the memory TAB1.

In the same manner as described above the system allows access for the end-user EU2 to the requested services provided via the routers R2 and R3. The end-user sends e.g. a DHCP request RQ21 for voice services. The request is received by the access node EDA1 and the control function adds a port identifier and sends a corresponding request RQ22 to the DHCP server DH1. The latter automatically and dynamically allocates an end-user IP host address from the address pool, and accessible routers R2 and R3. The DHCP server forms a DHCP reply message RP21 which includes the DHCP option 121. When the access node receives the reply RP21 the control function snoops the message content. The access node makes an ARP request for the routers MAC addresses and saves the information in the memory TAB2 as appears from the table below.

| Router R1: IP1: MACX | |
|---|---|
| IP Router IPN1 | 0.0.0.0/0 |
| Router R2: IP2: MACY | |
| IP Router IPN2 | 172.10.0.0/16 |
| | 192.168.10.0/24 |
| Router R3: IP3: MACZ | |
| IP Router IPN3 | 10.11.12.0/24 |
| | 10.11.15.0/24 |
| | 122.10.0.0/16 |

The IP router addresses for the routers R1, R2 and R3 are denoted in the table by IPN1, IPN2 and IPN3 respectively.

The control function CU1 of the access node EDA1 now can set the IP MAC addresses MACX, MACY and MACZ in the respective MAC filters MX, MY and MZ. The end-user EU1 therefore only can reach the routers R1, R2 and R3 and not e.g. the end-user EU2. This means that the connections in the access system ACC1 are secure and also that the end-users can utilize only the services which they are entitled to.

The access node has to send the DHCP reply to the end-user to make the requested service available. Now a problem

| Router R2: IP2: MACY | |
|---|---|
| IP Router IPN2 | 172.10.0.0/16 |
| | 192.168.10.0/24 |
| Router R3: IP3: MACZ | |
| IP Router IPN3 | 10.11.12.0/24 |
| | 10.11.15.0/24 |
| | 122.10.0.0/16 |

The control function will set the IP MAC addresses MACY and MACZ in the respective filters MY2 and MZ2 so that the end-user EU2 only can reach the routers R2 and R3 and the services provided via them. The access node adds the DHCP option 3 to the reply message RP21 and sends the whole as a message R22 to the end user EU2. The latter then sends an ARP request ARP2 including the IP router address IPN2 to the access node, which makes the services provided via the routers R2 and R3 available to the end-user EU2.

Figure 2:
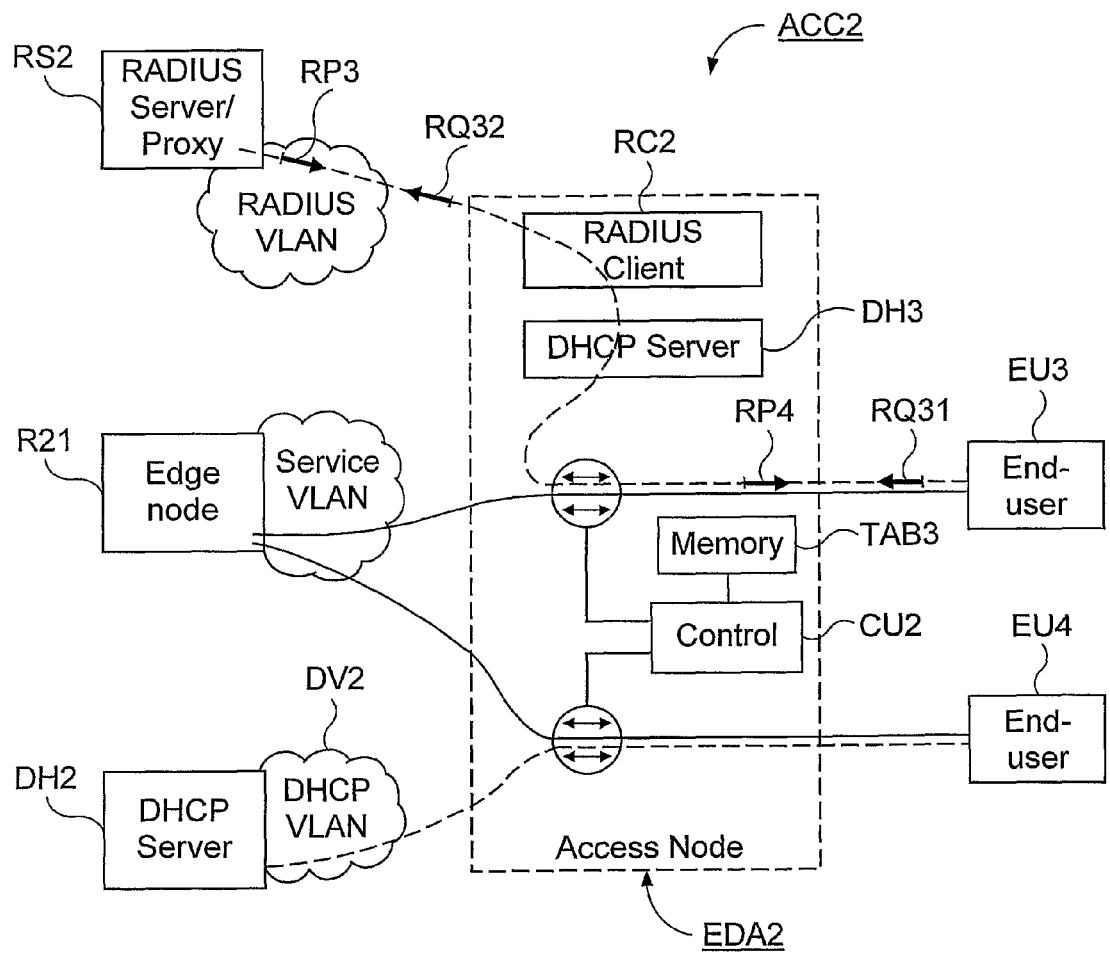
FIG. 2 shows a view over an alternative access system.

An alternative embodiment will be described in connection with FIG. 2. This embodiment is suitable for operators who use the RADIUS (Remote Authentication Dial-in User Service Protocol) protocol for authentication, authorization and accounting purposes between a BRAS (Broadband Remote Access Server) and an end-user configuration server. The BRAS comprises a RADIUS client RC2 and the configuration server is a RADIUS server RS2. The figure shows a view over an access system ACC2 with an access node EDA2, to which end users EU3 and EU4 are connected. A service provider access router R21 is connected to the access node. In the same manner as in the previous embodiment a DHCP server DH2 in a DHCP VLAN denoted DV2 is connected to the access node EDA2. The access node also has a local DHCP server DH3 connected to the abovementioned RADIUS client RC2. The latter is connected to the centrally located RADIUS server RS2. Compared to the DHCP-based model in FIG. 1 the RADIUS-based model replaces the DHCP server DH1 by the local DHCP server DH3 and the centrally located RADIUS server RS2.

When the end-user EU3 requests for service it will issue a DHCP request RQ31 in the same manner as described in connection with FIG. 1. The request RQ31 will be intercepted by the local DHCP server DH3 in the access node. The control function CU2 of the access node EDA2 sends a RADIUS request message RQ32 to the RADIUS server RS2 with this information. The RADIUS message RQ32 includes the content of the DHCP request RQ31 and a unique identification of the end-user EU3 by e.g. a port identifier normally used in the DHCP option 82. The RADIUS server RS2 dynamically allocates an end-user IP host address from the address pool, and access to relevant routers, e.g. the router R21. The server RS2 then sends a reply message RP3 providing host configuration information similar to that sent by the DHCP server DH1 in FIG. 1. The reply message RP3 is fed to the local DHCP server DH3 and as in the previous embodiment the access node EDA2 snoops the information in the message. The access node also saves the information in a memory TAB3 similar to the memory TAB1 described above. In its DHCP reply to the end user EU3 the access node EDA2 translates the reply message RP3 into a reply message RP4 suitable for end-users only supporting the DHCP option 3.

In the description above the DHCP option 121 is mentioned. Originally the DHCP option is targeted towards the end-users who use it to build a list of gateways and corresponding IP subnet. However, device support for DHCP option 121 cannot be assumed in general, and static IP configuration performed by the end-user of gateways is not considered a viable solution, as already mentioned above. An alternative, described above, is to generally assume that the end-user does not support DHCP option 121 and that the access nodes EDA1 and EDA2 must always do the necessary frame modification and switching that enables a multi-edge architecture.

This implies that the access node must direct the upstream traffic to the right gateway using layer-3 switching, i.e. switching based on the destination IP address. Likewise, downstream traffic must be modified so it looks as if it all came from the default gateway, i.e. the source MAC address must be changed to that of the default gateway.

A variant of this layer-3 switching is to use the access node MAC address as default gateway address for all end-users. This variant has the advantage of only using a single MAC address per access node for end-user traffic. In the present description this MAC address for the access node EDA1 is denoted MACE in FIG. 1.

Figure 3:
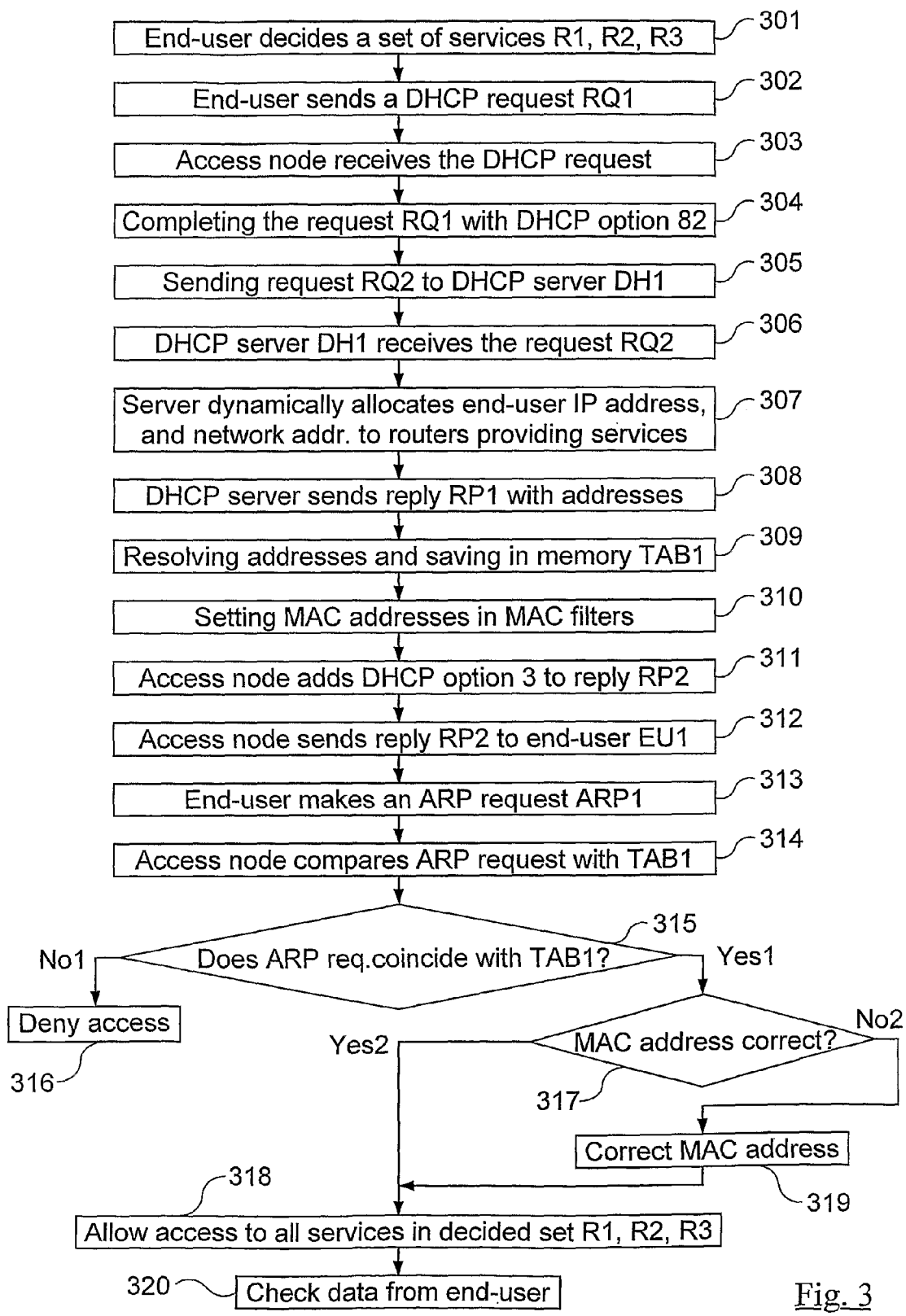
FIG. 3 shows a flowchart of the method.

In connection with FIG. 3 the method described above will be summarized. The method starts in a step 301, in which the end-user decides services to utilize and informs the network operator about the decision. In the example the services are provided via the routers R1, R2 and R3. The end-user, e.g. end-user EU1, sends the DHCP request RQ1 in a step 302 and in a step 303 the access node EDA1 receives the request and recognizes it as a DHCP message. The access node completes in a step 304 the request RQ2 with the DHCP option 82, identifying the end-user's port. In a step 305 the access node sends the request RQ2 to the DHCP server DH1, which receives it in a step 306. In a step 307 the DHCP server dynamically allocates both the IP network address to the end-user IP host from the address pool and accessible routers R1, R2 and R3. The DHCP server DH1 sends the DHCP reply RP1 to the access node in a step 308. In a step 309 the access node resolves the IP router addresses and saves the IP router addresses and IP MAC addresses in its memory TAB1. The IP MAC addresses are set in the MAC filters MX, MY and MZ in a step 310. In a step 311 the access node EDA1 adds the DHCP option 3 to the reply RP2 including the IP network address IPN1 and the router IP address MACX and sends the reply to the end-user in a step 312. Alternatively the reply RP2 has the IP MAC address MACE of the access node itself instead of the MAC address MACX.

In a step 313 the end-user EU1 makes the ARP request ARP1 with the addresses IPN1 and resolves this to the MAC address MACX. In a step 314 the access node EDA1 compares the addresses in the request ARP1 with the addresses in the memory TAB1. In a step 315 the access node investigates whether the IP address in the request ARP1 and in the memory TAB1 coincide. If not so, an alternative NO1, access is denied for the end-user EU1 in step 316. When the addresses coincide, an alternative YES1, the access node checks in a step 317 if the MAC address is the correct one. In an alternative YES2 the access node in a step 318 allows the end-user access to all the routers R1, R2 and R3 providing the services which the end-user EU1 once decided. In an alternative NO2 the access node EDA1 first corrects the MAC address in a step 319 before access to the routers is allowed. In a step 320 the destination MAC address and destination IP address are checked in data packets from the end-user.

Figure 4:
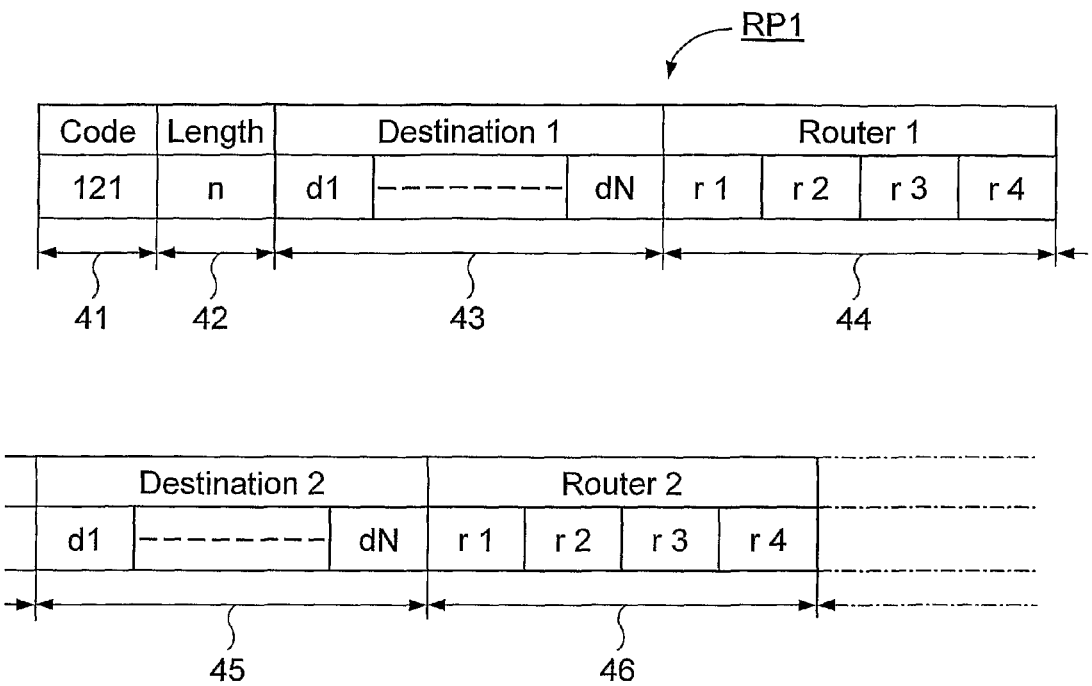
FIG. 4 shows a block schematic over a reply message.
Figure 5:
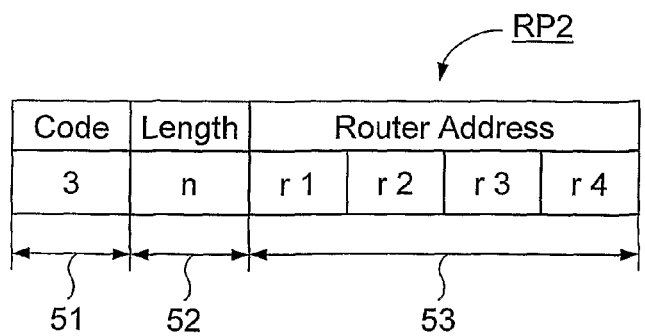
FIG. 5 shows a block schematic over a reply message.

In FIGS. 4 and 5 are shown more in detail the reply messages RP1 and RP2. As described above the access node EDA1 receives the reply message RP1 from the DHCP server DH1. The message has a code field 41 stating that it is an option 121 message, which is recognized by the control unit CU1. A length field 42 tells the length of the reply message. A first destination field 43 states which networks are available via the router R1, which is defined by its IP router address in a first router address field 44. The message RP1 continues with a second destination field 45 stating which networks are available via the router R2. This router is defined in a second router address field 46. The exemplified reply message RP1 has also destination- and router fields for the router R3, only hinted by dotted lines in the figure.

FIG. 5 shows the reply message RP2 from the access node EDA1 to the end-user EU1. The message has a code field 51 stating that it is an option 3 message. A length field 52 tells the length of the reply message. A router address field 53 gives the IP router address to the router R1 providing the initially requested service.

The invention claimed is:

1. A method in an access system providing multiple services and having an access node for connection to a plurality of routers and an end user, the method comprising the steps of:

receiving in the access node from the end user, a service request for a plurality of services;

sending the service request from the access node to a DHCP server;

receiving in the access node from the DHCP server, a dynamically allocated end-user IP host address and at least two IP addresses for routers accessible by the user and suitable for reaching the plurality of requested services;

saving in the access node, the received IP router addresses;

resolving and saving in the access node, IP MAC addresses of the allocated routers; and sending from the access node to the end user, at least one of the saved IP router addresses.

2. The method according to claim 1, wherein the DHCP-server is external to the access node.

3. The method according to claim 1, wherein the DHCP-server is internal to the access node and is connected to an access node internal RADIUS-server.

4. The method according to claim 1, further comprising the step of sending to the end-user, from the access node, the saved IP MAC address of at least one of the routers and the corresponding saved IP router address.

5. The method according to claim 1, further comprising the step of sending, to the end-user from the access node, an IP MAC address of the access node and at least one of the saved IP router addresses.

6. The method according to claim 1, further comprising the steps of:

determining by the end-user, a set of services among the multiple services;

receiving in the access node from the end user, an Address Resolution Protocol request including an IP router address;

comparing in the access node, the received IP router address with the saved at least two IP router addresses; and allowing the end user access to at least two routers providing the set of services when the received IP router address matches one of the saved IP router addresses.

7. The method according to claim 1, wherein the access node has MAC address filters for the different routers, and the method further comprises the step of writing the saved IP MAC addresses in the corresponding MAC address filters.

8. An arrangement in an access system providing multiple services, the arrangement comprising:

an access node for connection to a plurality of routers and an end user; and a DHCP server;

wherein:

the access node includes means for forwarding a service request from the end user to the DHCP server;

the DHCP server includes means for dynamically allocating an end-user host IP address and IP addresses to at least two accessible routers providing at least two of the multiple services and means for sending the allocated addresses to the access node;

the access node has a memory to save the allocated IP host address and IP router addresses;

the access node includes means for resolving the allocated IP router addresses into associated IP MAC addresses of the routers;

the access node includes means for saving the resolved IP MAC addresses in the memory; and the access node includes means for sending at least one of the saved IP router addresses to the end user.

9. The arrangement according to claim 8, wherein the DHCP server is external to the access node.

10. The arrangement according to claim 8, wherein the DHCP server is internal to the access node and is connected to an access node internal RADIUS server.

11. The arrangement according to claim 8, wherein the access node includes means for sending to the end-user, the saved IP MAC address of at least one of the routers and the corresponding at least one saved IP router address.

12. The arrangement according to claim 8, wherein the access node includes means for sending to the end-user, an IP MAC address of the access node itself and at least one of the saved IP router addresses.

13. The arrangement according to claim 8, wherein:

the end-user includes means for determining a set of services among the multiple services;

the access node includes means for receiving from the end user, an Address Resolution Protocol request including an IP router address;

the access node includes means for comparing the received IP router address with the saved at least two IP router addresses; and the access node includes means for allowing the end user access to at least two routers providing the set of services when the received IP router address matches one of the saved IP router addresses.

14. The arrangement according to claims 8, wherein the access node has MAC address filters for the routers, the filters storing the saved IP MAC addresses in the corresponding MAC address filters.

* * * * *